United States Patent
Dettinger et al.

(10) Patent No.: US 7,085,760 B2
(45) Date of Patent: Aug. 1, 2006

(54) DATA QUERY DIFFERENTIAL ANALYSIS

(75) Inventors: Richard D. Dettinger, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 10/264,124

(22) Filed: Oct. 3, 2002

(65) Prior Publication Data

US 2004/0068488 A1    Apr. 8, 2004

(51) Int. Cl.
    G06F 7/00    (2006.01)
    G06F 17/30   (2006.01)
    G06F 3/00    (2006.01)
(52) U.S. Cl. ........................................................ 707/5
(58) Field of Classification Search ................ 707/3–5
    See application file for complete search history.

(56) References Cited

U.S. PATENT DOCUMENTS

| | | | | |
|---|---|---|---|---|
| 5,175,814 A | * | 12/1992 | Anick et al. | 715/835 |
| 5,442,781 A | * | 8/1995 | Yamagata | 707/3 |
| 6,272,488 B1 | | 8/2001 | Chang et al. | |
| 6,430,552 B1 | * | 8/2002 | Corston-Oliver | 707/3 |
| 6,725,227 B1 | | 4/2004 | Li | |

* cited by examiner

*Primary Examiner*—Don Wong
*Assistant Examiner*—Cheryl M Shechtman
(74) *Attorney, Agent, or Firm*—Patterson & Sheridan, LLP (57) ABSTRACT

Method, system and article of manufacture for a query analysis approach used to identify the contribution each criterion has on overall query results. Generally, for each criterion (or criteria set) defined by a query, an assessment is made of the change in the number of items returned from the query if the criterion (or criteria set) is removed.

28 Claims, 5 Drawing Sheets

| (GENDER = "FEMALE" OR DIAGNOSIS = "LIVER DISEASE") | 602 | RUN | 604 |

| CRITERION | | |
|---|---|---|
| (GENDER = "FEMALE" OR DIAGNOSIS = "LIVER DISEASE") AND AGE > 60 | | RESULTS |
| X | | + 18,000 |
| | X | + 19,500 |
| X | X | − 40,000 |
| X | | |
| | X | |
| X | X | |

Fig. 6

DATA QUERY DIFFERENTIAL ANALYSIS

BACKGROUND OF THE INVENTION

1. Field of the Invention

The present invention generally relates to data processing and more particularly to accessing data in a data repository, such as a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

A query includes one or more criterion for data selection. For example, the criterion may specify a data range, test for an existence condition, test for equivalence, or perform a similar table comparison operation. The criterion may be logically related by Boolean operators (e.g., AND, OR). Consider the following query involving two criterions (i.e. the comparisons in the WHERE clause) which are ANDed together.

| QUERY 1 | |
|---|---|
| 0001 | SELECT T1.Col1 |
| 0002 | FROM T1,T2 |
| 0003 | WHERE T1.Col1 = T2.Col1 AND T1.Col2 = 'A' AND T2.Col2 = 'B' |

Query 1 will return a value from Col1 in T1 for every pair of records in T1 and T2 where Col1 values match, and the value of T1.Col2 is 'A', and the value of T2.Col2 is 'B'.

One of the challenges encountered when querying information from a large database or data warehouse is to understand how changes in query logic affect the data returned from a given query. In particular, when the query is complex, involving a large number of criteria associated with logic operators (e.g., AND and OR), it can be difficult to understand from the query which criterion has the greatest impact on the number of items returned from a query. The impact each criterion has on an overall query may be either positive or negative. A criterion that has a negative impact returns undesired results while a criterion that has a positive impact returns desired results. For example, a user may desire a particular sample size, in which case a criterion that excludes a large number of items from overall query results has a negative impact. Alternatively, a user may be looking for particular records, in which case a criterion that excludes desired records from overall query results has a negative impact. Knowing the impact of each criterion can be important to the user, especially when the initial query returns either too little information or too much information. In such situations, the user running the query would like to easily understand how to modify the query to meet their data requirements. Unfortunately, conventional database environments provide the user with no choice but to iteratively re-craft and re-execute queries until arriving at an acceptable results set. This "trial and error process is both time consuming and inefficient.

Therefore, there is a need for improved query analysis.

SUMMARY OF THE INVENTION

The present invention generally provides methods, systems and articles of manufacture for a query analysis approach used to identify the contribution each criterion (or combination of criterion) has on overall query results.

One embodiment provides a method of programmatically determining an effect of one or more query criterion on results returned by executing a query containing the one or more query criterion. The method comprises receiving results from executing the query against a data source; programmatically building a modified form of the query by removing at least one query criterion from the query; receiving results from executing the modified form of the query; and determining an effect of the at least one query criterion on the results received from executing the query against the data source relative to results received from executing the modified form of the query.

Another embodiment provides a method of programmatically determining an effect of one or more query criterion on results returned by executing a query containing the one or more query criterion, comprising: receiving the query from a requesting entity; executing the query against a database of a database management system; receiving results from executing the query; programmatically building a modified form of the query by removing at least one query criterion from the query; executing the modified form of the query against the results received from executing the query against the database if the at least one criterion is logically ORed in the query; executing the modified form of the query against the database if the at least one criterion is logically ANDed in the query; and determining an effect of the at least one query criterion on the results received from executing the query against the database relative to results received from executing the modified form of the query.

Yet another embodiment provides a computer readable medium containing a program which, when executed, performs an operation for determining an effect of one or more query criterion on results returned by executing a query containing the one or more query criterion. The operation comprises receiving results from executing the query against a data source; programmatically building a modified form of the query by removing at least one query criterion from the query; receiving results from executing the modified form of the query; and determining an effect of the at least one query criterion on the results received from executing the query against the data source relative to results received from executing the modified form of the query.

Still another embodiment provides a computer comprising a memory containing query analysis software and a processor which, when configured by the query analysis software, performs an operation comprising (i) submitting the query for execution against a data source; (ii) building a modified form of the query by removing at least one query criterion from the query; (iii) submitting the modified form of the query for execution; and (iv) determining an effect of the at least one query criterion on results received from executing the query against the data source relative to results received from executing the modified form of the query.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Methods, systems and articles of manufacture are provided for a query analysis approach used to identify the contribution each criterion (or combination of criterion) has on overall query results. Generally, for each criterion defined by a query, an assessment is made of the change in the number of items returned from the query if the criterion is removed. The query may then be intelligently modified to either return more or less information based on these differential statistics. As used herein, a "query" includes a combination of commands intended to produce one or more output data tables according to specification included in the query. Although reference is made to SQL in some embodiments, non-SQL query languages are within the scope of the present invention.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
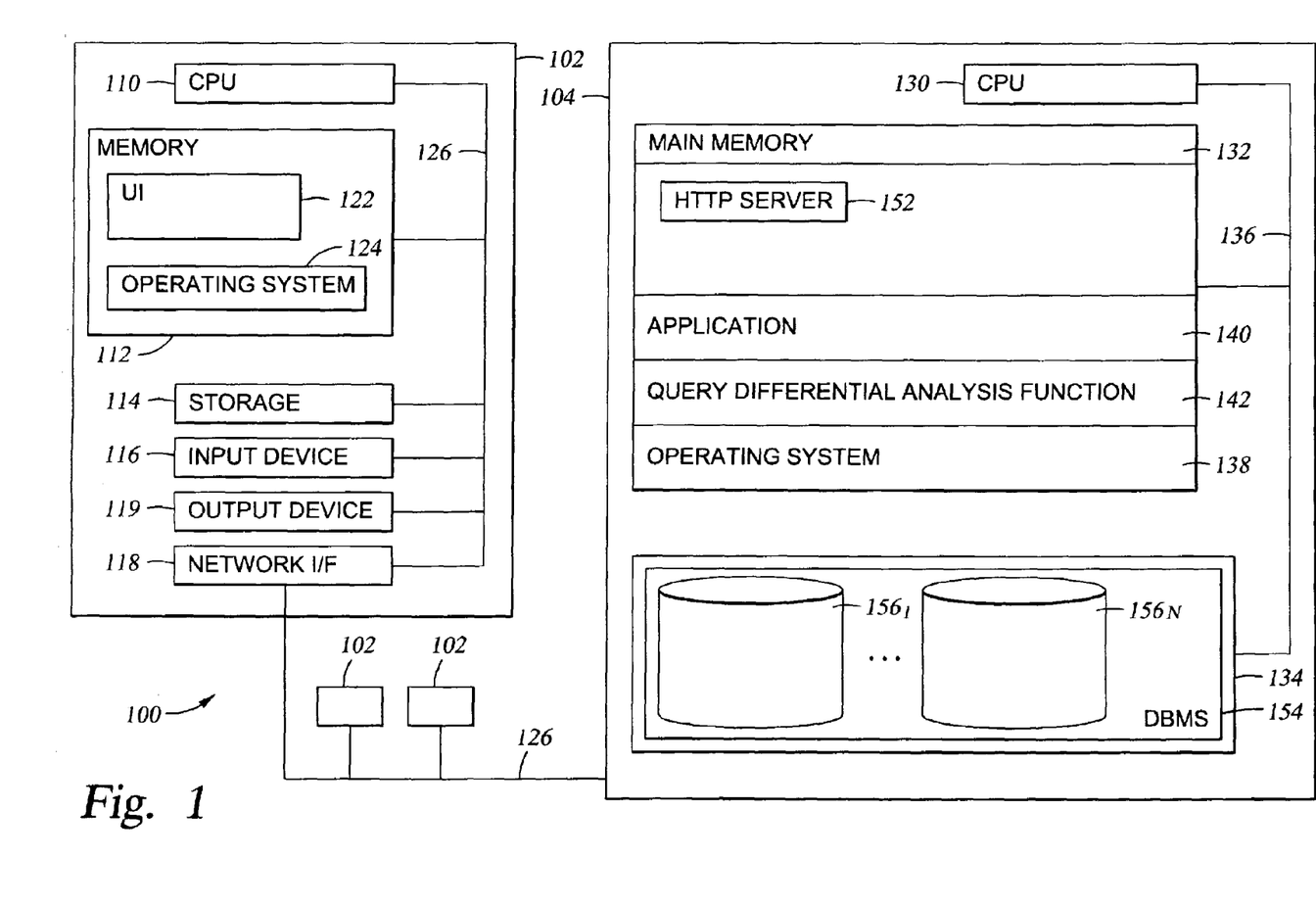
FIG. 1 is a schematic of a computer environment implementing one embodiment of the invention.

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a UI program 122 that, when executed on CPU 110, provides support for navigating between the various servers 104 and locating network addresses at one or more of the servers 104. In one embodiment, the UI program 122 includes a web-based Graphical User Interface (GUI), i.e., a browser, which allows the user to display Hyper Text Markup Language (HTML) information. More generally, however, the UI program 122 is representative of any user interface (whether or not GUI-based) capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used. The server computer 104 includes databases $156_1$... $156_N$, collectively referred to as database(s) 156. The databases 156 are representative of any collection of data regardless of the particular physical representation/arrangement or schema. By way of illustration, the databases 156 may be organized according to a relational schema (accessible by SQL queries) or according to an XML schema (accessible by XML queries). However, again, the invention is not limited to a particular schema and contemplates extension to schemas presently unknown. Illustratively, the databases 156 are shown as part of a database management system (DBMS) 154 in storage 134. Illustratively, the DBMS 154 comprises the "DB2" product offered by the IBM Corporation for the "MVS", "AIX", or "OS/2" operating systems. Generally, those skilled in the art will recognize that the present invention has application to any DBMS software that uses SQL, and may similarly be applied to non-SQL queries. More generally, however, it should be understood that the data to be accessed need not be part of a DBMS at all.

Figure 2:
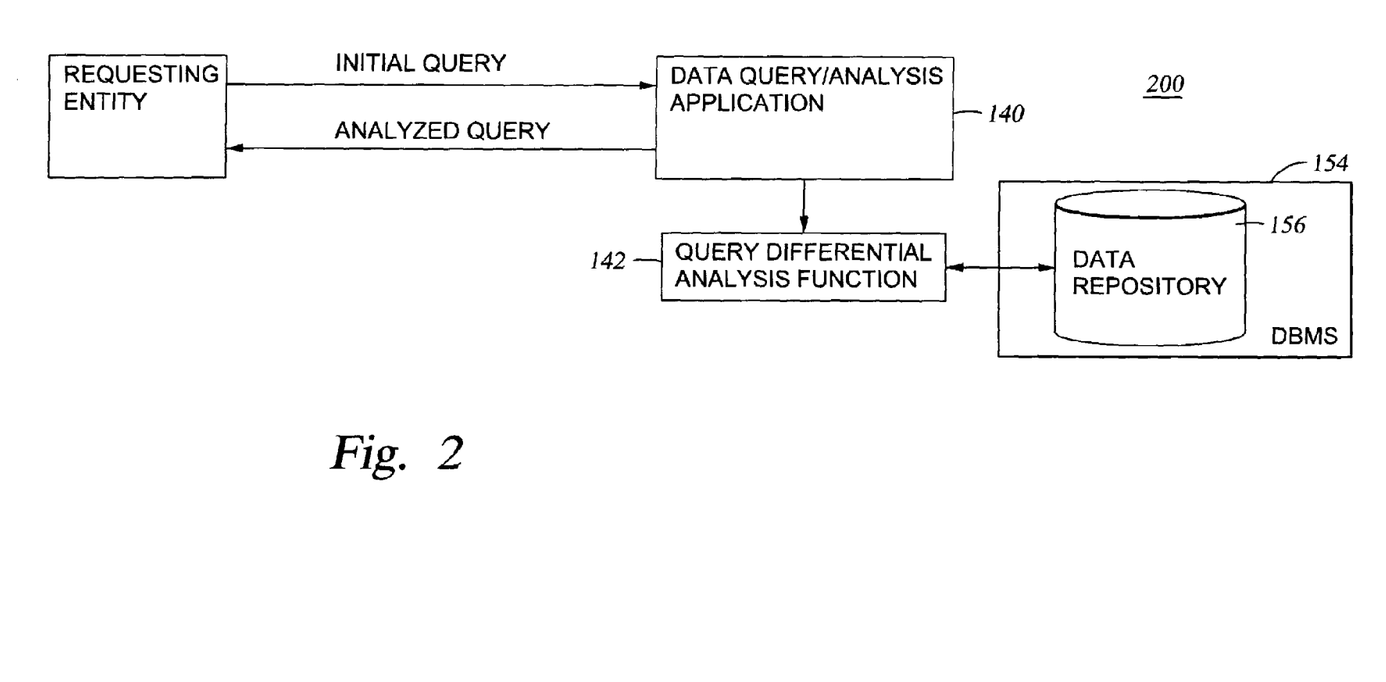
FIG. 2 is a relational view of a requesting entity, an application, a query differential analysis function and a database.

The memory 132 further includes a query/analysis application 140 (referred to herein as "application 140") and a query differential analysis function 142 (referred to herein as "function 142"). The application 140 and function 142 are software products comprising a plurality of instructions that are resident at various times in various memory and storage devices in the computer system 100. When read and executed by one or more processors 130 in the server 104, the application 140 and function 142 cause the computer system 100 to perform the steps necessary to execute steps or elements embodying the various aspects of the invention. The relationship between a requesting entity 202, the application 140, the function 142 and the databases 156 is shown in FIG. 2. In one embodiment, the application 140 prompts the requesting entity 202 for a query and/or criterion selection information. The application 140 then calls the function 142 which, in turn, issues queries against the database 156. The requesting entity 202 may be any requesting entity, including the operating system 138, another application and end users.

Although shown as separate elements, the application 140 and the function 142 may be integral software components. In one embodiment, the application 140 and the function 142 may be integral to the DBMS 154.

In one embodiment, elements of a query are specified by a user through a graphical user interface (GUI) represented by the UI program 122. The content of the GUIs may be generated by the application 140. In a particular embodiment, the GUI content is hypertext markup language (HTML) content which may be rendered on the client computer systems 102 with the UI program 122. Accordingly, the memory 132 includes a Hypertext Transfer Protocol (http) server process 152 (e.g., a web server) adapted to service requests from the client computer 102. For example, the process 138 may respond to requests to access a database(s) 156, which illustratively resides on the server 104. Incoming client requests for data from a database 156 invoke the application 140. When executed by the processor 130, the application 140 causes the server computer 104 to perform the steps or elements embodying the various aspects of the invention, including accessing the database(s) 156. In one embodiment, the application 140 comprises a plurality of servlets configured to build GUI elements, which are then rendered by the UI program 122.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 152 shown in FIG. 1 is merely illustrative and other embodiments adapted to support any known and unknown protocols are contemplated.

In operation, the application 140 and the function 142 cooperate to perform differential query analysis. In general, the differential query analysis includes determining an impact of a criterion or a set of criteria of a query. Results are returned to the requesting entity, which may then re-craft the query in order to change the results set. Consider the following query:

Query 2

(Gender="Female" OR Diagnosis="Liver Disease") AND Age>60

In this example, the query has three criterion: Gender="Female", Diagnosis="Liver Disease", and Age>60. Illustratively, each criterion comprises conditions with one or more expressions (e.g., gender, diagnosis and age) and a comparison operator (e.g., =and >). The first and second criterions are logically ORed. The result of this operation is logically ANDed with the third criterion. Differential query analysis can be performed to determine the impact of each criterion. If this query returns a larger than desired number of results, the requesting entity may use the information provided by the differential query analysis to reduce the number of results.

Figure 3:
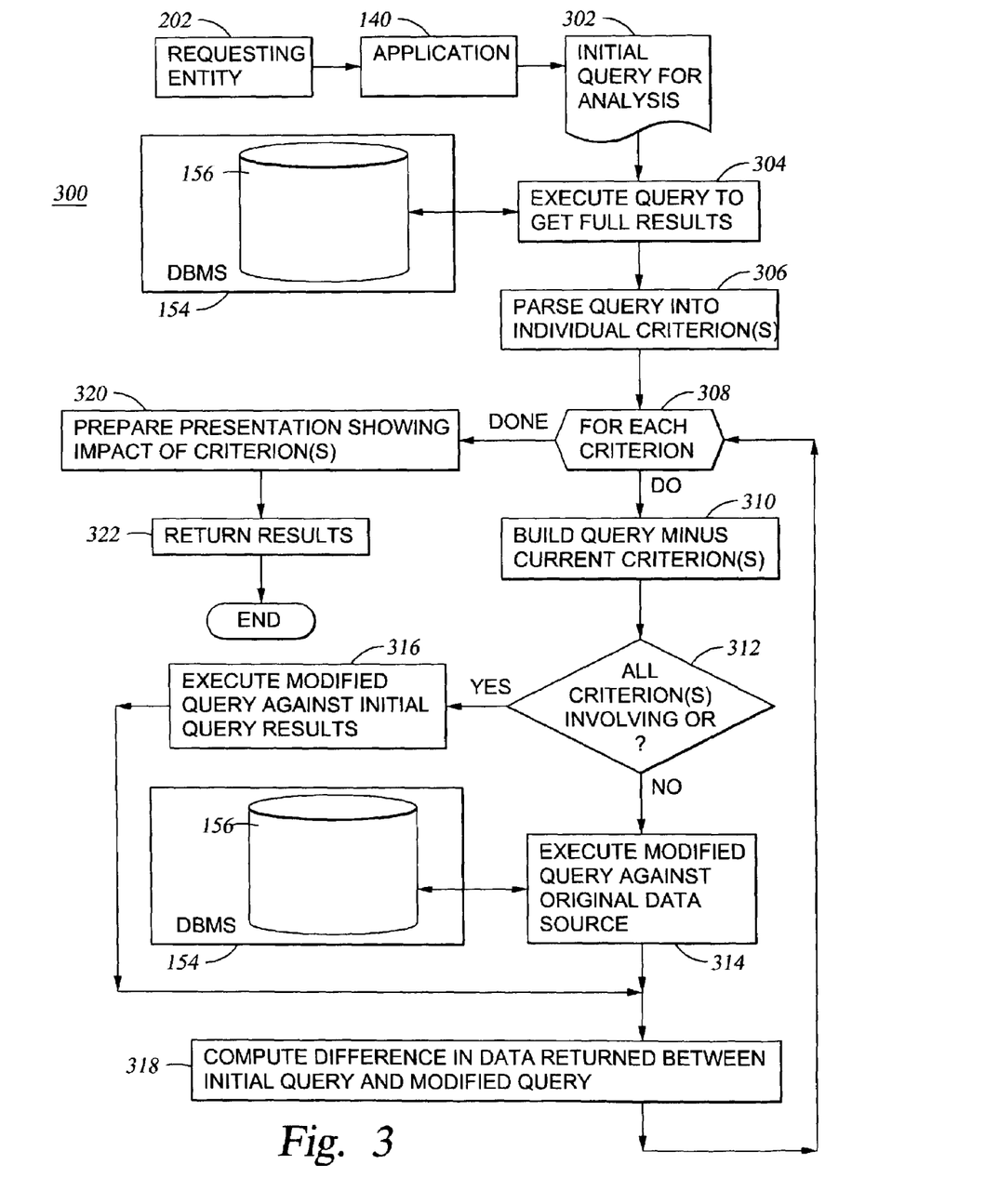
FIG. 3 is a flow chart illustrating one embodiment of query differential analysis.

FIG. 3 shows one embodiment of a method 300 for performing query differential analysis. In one embodiment, the method 300 describes the operation of the function 142. However, more generally, the method 300 describes an operation which may be performed by one or more software components. For purposes of illustration, the method 300 will be described assuming the initial query is QUERY 2 described above. It is also assumed that this query returns a large volume of data, e.g., 20,000 items. The method 300 is entered when an initial query 302 (e.g., QUERY 2) is received for analysis. In one embodiment, the function 142 receives the initial query from the application 140 (which, in turn, received the query from the requesting entity 202). The query is then executed (step 304) against the database(s) 156. At step 306, the query is parsed into individual criterions. A loop is entered at step 308 in which steps are performed for each criterion of the query. Specifically, for a given criterion, a modified query (of the original query 302) is built without a given criterion. At step 312, the method 300 determines whether the given criterion involves an OR operator. If not, the modified query is executed against the original data source (i.e., the database(s) 156) at step 314. If, however, the given criterion which has been removed from the query is logically connected to the original query by an OR operator, then the modified query is executed against the initial query results received at step 304. Using this approach, compilation of differential query analysis statistics is done intelligently, thereby minimizing the need to redundantly query information when looking at all permutations of a given query. Specifically, when assessing the impact of a criterion that is associated with an OR operator, it is possible to evaluate the original query, minus the ORed condition, against the results generated by the initial query, to determine how many fewer items would be returned relative to the original query. In this case, it would not be necessary to re-execute the query permutation against the complete data source (i.e., database(s) 156). This is based on the fact that an ORed criterion will add additional items to query results, thus removal of the ORing criterion will result in some subset of items returned from the original query. Taking advantage of this knowledge would optimize the amount of time and system resources required to perform query differential analysis.

In any case, the difference in the data returned (i.e., the number of results) between the initial query and the modified query is determined at step 318. The method 300 then returns to step 308 to repeat the loop for the next criterion in the initial query. The loop is repeated for each criterion, after which processing proceeds to step 320. At step 320, a presentation showing the impact of each criterion is prepared. The results to be displayed (i.e., the impact of each criterion) are returned at step 322. Specifically, the results may be provided to the UI program 122 for rendering and display to a user.

For those embodiments in which the results are not to be displayed to an end-user, but rather consumed by some other software components (e.g. an application), some processing of method 300 (e.g., step 320) may be unnecessary. For example, an application may request some number (N) of results. Accordingly, the processing of method 300 may be iteratively repeated for a number of query permutations until the desired number (N) of results is returned.

Another variation would allow for query differential analysis based on a set of query criteria. In such an embodiment, the requesting entity selects a set of criteria to eliminate for purposes of the query differential analysis. The analysis process would then proceed in a manner similar to that described above, except that the loop entered at step 308 need not be iteratively executed. Accordingly, the query is built without the set of criteria (step 310). The method 300 then determines whether each criterion is ORed (step 312). If any criterion is not ORed, the modified query is executed against the original data source (i.e., database(s) 156) at step 314. If every criterion is ORed, the modified query is executed against the initial query results generated at step 304. Subsequent processing is the same as described above.

Figure 4:
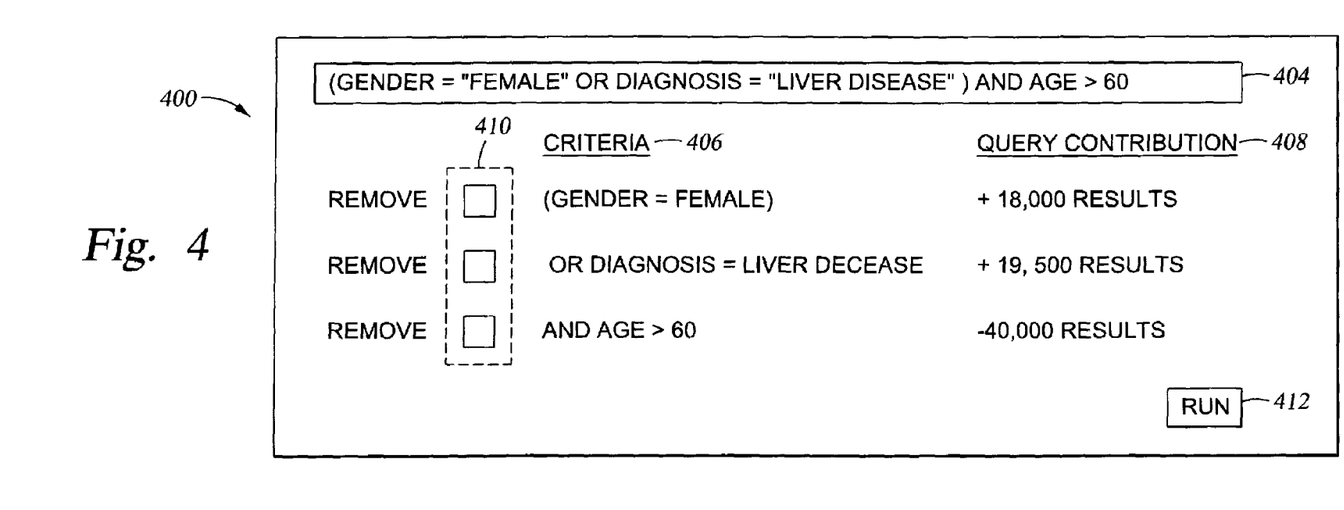
FIG. 4 is a one embodiment of a graphical user interface screen formatted with query contribution annotations.

In the foregoing embodiments, a modified query is executed, either against the original database or some results set returned as a result of executing the original unmodified query. However, it is contemplated that the differential analysis may be accomplished at the front end, without executing a second (i.e., modified query). Specifically, the runtime component 150 (specifically the database engine) may be configured to determine the impact of each query component at the time of executing each query. Accordingly, for any given query, the contribution of a query component will be known following execution of the given query. The resulting statistical information can be stored and used for subsequent analysis.

Where the requesting entity is a human operator (end-user), there are a number of possible embodiments for rendering the information provided by the query differential analysis approach of the present invention. In one embodiment, the user is presented the original query with each predicate annotated with the number of additional or fewer items returned if the condition is removed. One such embodiment is shown in FIG. 4. Illustratively, FIG. 4 shows a user interface screen 400 rendered by the UI program 122 in which the complete original query is shown in a query input field 402. The results of parsing the query into its individual criterions (performed at step 306 of method 300) is shown in a CRITERIA column 406. The Boolean operators are also shown between the respective criterions. The contribution of each criterion (calculated at step 318 of method 300) is shown in a QUERY CONTRIBUTION column 408. The annotated results indicate that criterions involving the Gender criterion contributed 18,000 results and the Diagnosis criterion contributed 19,500 results to the original query. Accordingly, removal of either of these criterions would significantly reduce the number of items returned form the query. Conversely, the Age criterion had a negative contribution of 40,000 results, meaning that removal of the Age criterion would lead to a significant increase in the number of items returned. The user interface screen 400 is also configured with a Remove check boxes 410 available for each criterion. By checking two or more of the remove check boxes 410 and then clicking the Run button 412, a requesting entity can determined the impact of a criteria set on a query.

Figure 5:
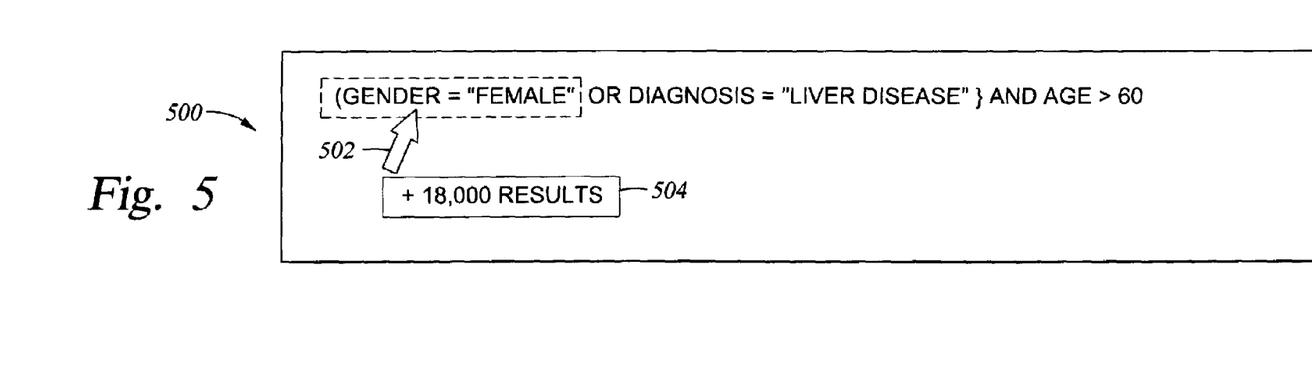
FIG. 5 is a one embodiment of representative output showing query contributions in a fly over text.

Referring now to FIG. 5, another embodiment of a user interface screen 500 shown. In particular, the user interface screen 500 shows how flyover text can be used to advantage. A flyover text box 504 is displayed when a mouse pointer 502 is brought sufficiently close to one of the query criterion. Specifically, the flyover text box 504 is invoked when the mouse pointer 502 is within an active screen area associated with a query criterion. Illustratively, the mouse pointer 502 is shown within the active screen area (represented by dashed box) of the first criterion (Gender="Female"). Accordingly, the contents of the flyover text box 504 indicate that removing the criterion would result in a reduction of 18,000 results.

Figure 6:
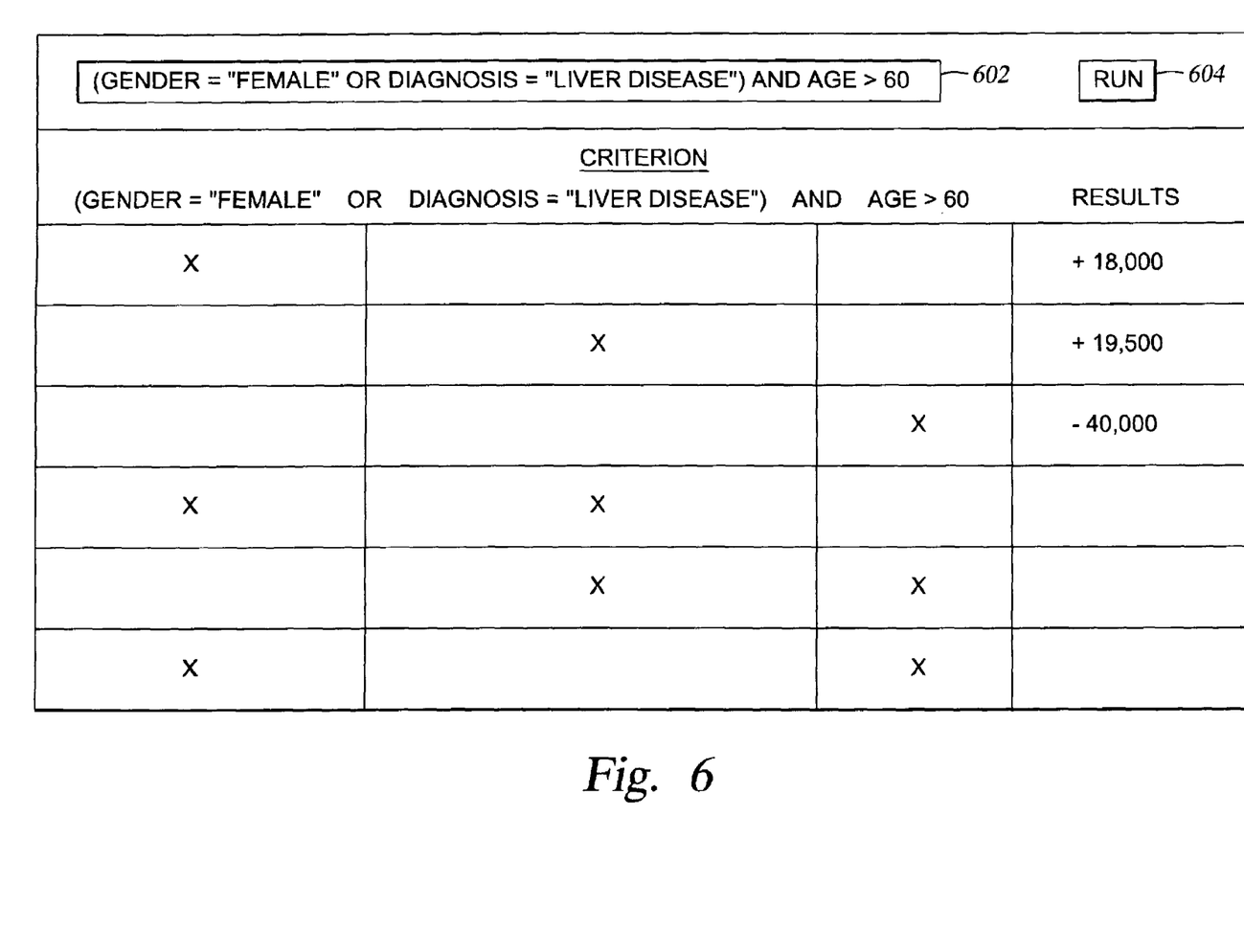
FIG. 6 is a one embodiment of representative output showing query contributions of each query permutation of a query.

FIG. 6 shows yet another embodiment of a user interface screen 600. In this embodiment, a matrix-style representation is employed to collectively show the change in results for each permutation in which a single criterion is removed from the original query. The query is input to an input field 602. Clicking on the Run button 604 produces the results in the form of a column for each criterion, 604$_1$, 604$_2$ and 604$_3$, and a results column 606 for each permutation. The "Xs" indicate which criterion(s) has been removed from the query for the permutation of that row.

In each of the foregoing embodiments the actual results of executing the query are not displayed. However, in other embodiments, the results can be displayed.

While the foregoing is directed to embodiments of the present invention, other and further embodiments of the invention may be devised without departing from the basic scope thereof, and the scope thereof is determined by the claims that follow.

What is claimed is:

1. A computer implemented method of programmatically determining an effect of one or more query criterions on results returned by executing a query containing the one or more query criterions, comprising:
   receiving results from executing the query against a data source;
   receiving a user selection of the one or more query criterions;
   in response to receiving the user selection, invoking a query differential analysis function to programmatically build a modified form of the query by removing the one or more query criterions from the query;
   receiving results from executing the modified form of the query against the results received from executing the query;
   calculating an effect of the one or more query criterions on the results received from executing the query against the data source relative to results received from executing the modified form of the query; and
   displaying output indicative of the effect.

2. The method of claim 1, wherein calculating the effect comprises computing a difference in a number of the results received from executing the query and a number of the results received from executing the modified query.

3. The method of claim 1, wherein the query differential analysis function is invoked in response to being called by an application.

4. The method of claim 1, wherein the modified form of the query is executed against the results received from executing the query against the data source as a result of determining that the one or more query criterions are logically ORed in the query.

5. The method of claim 1, wherein displaying the output comprises displaying the one or more query criterions and a value indicating a difference in the number of results received from executing the query relative to a number of results received from executing the modified form of the query.

6. A computer implemented method of programmatically determining an effect of one or more query criterions on results returned by executing a query containing the one or more query criterions, comprising:
   receiving results from executing the query against a data source;
   receiving a user selection of the one or more query criterions;
   in response to receiving the user selection, invoking a query differential analysis function to programmatically build a modified form of the query by removing the one or more query criterions from the query;
   receiving results from executing the modified form of the query, wherein the modified form of the query is executed against the data source if the one or more query criterions are logically ANDed in the query and wherein the modified form of the query is executed against the results received from executing the query if the one or more query criterions are logically ORed in the query;
   calculating an effect of the one or more query criterions on the results received from executing the query against the data source relative to results received from executing the modified form of the query; and
   displaying output indicative of the effect.

7. The method of claim 6, wherein the one or more query criterions comprise two or more criterions of the query and wherein the modified form of the query is executed against the data source if any of the two or more criterions are logically ANDed in the query and wherein the modified form of the query is executed against the results received from executing the query if each of the two or more criterions are logically ORed in the query.

8. A computer implemented method of programmatically determining an effect of one or more query criterions on results returned by executing a query containing the one or more query criterions, comprising:
   receiving a number, N, of results from executing the query against a data source;
   receiving a user selection of the one or more query criterions;
   programmatically calculating an effect of at least the one or more query criterions on the number, N, of results received from executing the query against the data source,
   wherein calculating the effect comprises computing a difference in the number, N, of results received from executing the query and a number, M, of results received from executing a second query, wherein the second query is executed against the results received from executing the query; and
   displaying output indicative of the effect.

9. The method of claim 8, wherein second query is executed against the results received from executing the query against the data source as a result of the one or more query criterions logically ORed in the query.

10. A computer implemented method of programmatically determining an effect of one or more query criterions on results returned by executing a query containing the one or more query criterions, comprising:
   receiving a number, N, of results from executing the query against a data source;
   receiving a user selection of the one or more query criterions;
   programmatically calculating an effect of at least the one or more query criterions on the number, N, of results received from executing the query against the data source,
   wherein calculating the effect comprises computing a difference in the number, N, of results received from executing the query and a number, M, of results received from executing a second query, wherein the second query is executed against the data source if the one or more query criterions are logically ANDed in the query and wherein the second query is executed against the results received from executing the query if the one or more query criterions are logically ORed in the query; and displaying output indicative of the effect.

11. The method of claim 10, wherein the one or more query criterions comprise two or more criterions of the query and wherein the second query is executed against the data source if any of the two or more criterions are logically ANDed in the query and wherein the second query is executed against the results received from executing the query if each of the two or more criterions are logically ORed in the query.

12. A computer implemented method of programmatically determining an effect of one or more query criterions on results returned by executing a query containing the one or more query criterion, comprising:

receiving the query from a requesting entity;

executing the query against a database of a database management system;

receiving results from executing the query;

receiving a user selection of the one or more query criterions;

in response to receiving the user selection, invoking a query differential analysis function to programmatically build a modified form of the query by removing the one or more query criterions from the query;

executing the modified form of the query against the results received from executing the query against the database if the one or more query criterions are logically ORed in the query;

executing the modified form of the query against the database if the one or more query criterions are logically ANDed in the query; and calculating an effect of the one or more query criterions on the results received from executing the query against the database relative to results received from executing the modified form of the query; and displaying output indicative of the effect.

13. The method of claim 12, wherein the requesting entity is an end-user.

14. The method of claim 12, wherein the requesting entity is an application.

15. The method of claim 12, wherein displaying the output comprises displaying the one or more query criterions and a value indicating a difference in a number of results received from executing the query relative to a number of results received from executing the modified form of the query.

16. A computer readable medium containing a program which, when executed, performs an operation for determining an effect of one or more query criterions on results returned by executing a query containing the one or more query criterions, the operation comprising:

receiving results from executing the query against a data source;

receiving a user selection of the one or more query criterions;

in response to receiving the user selection, invoking a query differential analysis function to programmatically build a modified form of the query by removing the one or more query criterions from the query;

receiving results from executing the modified form of the query against the results received from executing the query;

calculating an effect of the one or more query criterions on the results received from executing the query against the data source relative to results received from executing the modified form of the query; and displaying output indicative of the effect.

17. The computer readable medium of claim 16, wherein calculating the effect comprises computing a difference in a number of the results received from executing the query and a number of the results received from executing the modified query.

18. The computer readable medium of claim 16, wherein the query differential analysis function is invoked in response to being called by an application.

19. The computer readable medium of claim 16, wherein the modified form of the query is executed against the results received from executing the query against the data source as a result of determining that the one or more query criterions are logically ORed in the query.

20. The computer readable medium of claim 16, wherein the modified form of the query is executed against the data source if the one or more query criterions are logically ANDed in the query.

21. The computer readable medium of claim 16, wherein displaying the output comprises displaying the one or more query criterions and a value indicating a difference in a number of the results received from executing the query relative to a number of the results received from executing the modified form of the query.

22. A computer readable medium containing a program which, when executed, performs an operation for determining an effect of one or more query criterions on results returned by executing a query containing the one or more query criterions, the operation comprising:

receiving results from executing the query against a data source;

receiving a user selection of the one or more query criterions;

in response to receiving the user selection, invoking a query differential analysis function to programmatically build a modified form of the query by removing the one or more query criterions from the query;

receiving results from executing the modified form of the query, wherein the modified form of the query is executed against the data source if the one or more query criterions are logically ANDed in the query and wherein the modified form of the query is executed against the results received from executing the query if the one or more query criterions are logically ORed in the query;

calculating an effect of the one or more query criterions on the results received from executing the query against the data source relative to results received from executing the modified form of the query; and displaying output indicative of the effect.

23. The computer readable medium of claim 22, wherein the one or more query criterions comprise two or more criterions of the query and wherein the modified form of the query is executed against the data source if any of the two or more criterions are logically ANDed in the query and wherein the modified form of the query is executed against the results received from executing the query if each of the two or more criterions are logically ORed in the query.

24. The computer readable medium of claim 22, wherein displaying the output comprises displaying the one or more query criterions and a value indicating a difference in a number of the results received from executing the query relative to a number of the results received from executing the modified form of the query.

25. A computer, comprising:

a memory containing query analysis software; and a processor which, when configured by the query analysis software, performs an operation comprising:

submitting a query for execution against a data source;

receiving a user selection of the one or more query criterions;

in response to receiving the user selection, invoking a query differential analysis function to programmatically build a modified form of the query by removing the one or more query criterions from the query;

submitting the modified form of the query for execution, wherein the modified form of the query is executed against the data source if the one or more query criterions are logically ANDed in the query and wherein the modified form of the query is executed against the results received from executing the query if the one or more query criterions are logically ORed in the query;

calculating an effect of the one or more query criterions on results received from executing the query against the data source relative to results received from executing the modified form of the query; and displaying output indicative of the effect.

26. The computer of claim 25, further comprising a display device and wherein the operation comprises displaying output on the display device indicative of the effect of the one or more query criterions on the results received from executing the query relative to results received from executing the modified form of the query.

27. The computer of claim 26, wherein displaying the output comprises displaying the one or more query criterions and a value indicating a difference in a number of the results received from executing the query relative to a number of the results received from executing the modified form of the query.

28. The computer of claim 25, wherein displaying the output comprises displaying the one or more query criterions and a value indicating a difference in a number of the results received from executing the query relative to a number of the results received from executing the modified form of the query.

* * * * *